(12) United States Patent
Sim et al.

(10) Patent No.: US 10,075,235 B2
(45) Date of Patent: Sep. 11, 2018

(54) METHOD AND APPARATUS FOR DATA TRANSMISSION

(71) Applicant: Samsung Electronics Co., Ltd., Gyeonggi-do (KR)

(72) Inventors: Tae-Seok Sim, Gyeonggi-do (KR); Jong-Seok Kim, Seoul (KR); Hee-Bum Ahn, Seoul (KR); Yo-Han Lee, Gyeonggi-do (KR); Young-Keun Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 112 days.

(21) Appl. No.: 14/875,878

(22) Filed: Oct. 6, 2015

(65) Prior Publication Data

US 2016/0099774 A1    Apr. 7, 2016

(30) Foreign Application Priority Data

Oct. 6, 2014   (KR) .................. 10-2014-0134418

(51) Int. Cl.
| | |
|---|---|
| *H04B 10/00* | (2013.01) |
| *H04K 1/00* | (2006.01) |
| *H04B 10/116* | (2013.01) |
| *H04W 88/06* | (2009.01) |
| *H04W 4/80* | (2018.01) |
| *G03B 21/00* | (2006.01) |

(52) U.S. Cl.
CPC ........... *H04B 10/116* (2013.01); *H04B 10/00* (2013.01); *H04W 88/06* (2013.01); *G03B 21/00* (2013.01); *H04W 4/80* (2018.02)

(58) Field of Classification Search
CPC .. H04L 9/0819; H04L 310/114; H04L 9/0869; H04L 63/0428; H04W 88/06; H04W 4/008; H04W 52/0235; H04B 10/116; H04B 10/00; H04B 10/114
USPC .................................. 398/115–118
See application file for complete search history.

(56) References Cited

U.S. PATENT DOCUMENTS

| | | | | |
|---|---|---|---|---|
| 5,640,390 A * | 6/1997 | Sakamoto | ............. | H04W 36/16 370/346 |
| 5,684,838 A * | 11/1997 | Kanda | .................... | H04L 7/033 341/53 |
| 6,400,482 B1 * | 6/2002 | Lupton | .............. | H04B 10/1143 398/106 |
| 7,085,287 B1 * | 8/2006 | Chapman | ............ | H04L 12/2801 370/468 |
| 7,246,324 B2 * | 7/2007 | Mikhail | .................. | G06F 9/542 707/E17.117 |
| 7,436,965 B2 * | 10/2008 | Sherman | ............... | G06F 21/606 380/277 |
| 7,876,897 B2 * | 1/2011 | Yi | ....................... | H04L 63/0428 380/270 |
| 7,991,292 B2 * | 8/2011 | Takeshita | ................ | H04L 63/08 398/115 |

(Continued)

*Primary Examiner* — Ken N Vanderpuye
*Assistant Examiner* — Abbas H Alagheband
(74) *Attorney, Agent, or Firm* — Cha & Reiter, LLC

(57) ABSTRACT

An electronic device comprising: a visible light communication (VLC) transmitter; a radio transmitter; and at least one processor, configured to: control the radio transmitter to transmit a first data item to a receiving device; and control the VLC transmitter to transmit a second data item to the receiving device.

16 Claims, 21 Drawing Sheets

(56) References Cited

U.S. PATENT DOCUMENTS

| | | | | |
|---|---|---|---|---|
| 8,406,427 B2* | 3/2013 | Chand | .................... | H04K 3/25 380/255 |
| 8,635,645 B2* | 1/2014 | Krishnamoorthi | .... | H04L 12/189 370/312 |
| 8,666,259 B2* | 3/2014 | Lim | .................... | H04B 10/116 398/140 |
| 8,699,887 B1* | 4/2014 | Rothenberg | ......... | H04B 10/116 315/158 |
| 9,432,802 B2* | 8/2016 | Matsushita | ............. | H04W 4/02 |
| 9,497,495 B2* | 11/2016 | Krishnamoorthi | .... | H04L 12/189 |
| 2003/0142640 A1* | 7/2003 | Pajukoski | ............ | H04B 1/7107 370/321 |
| 2004/0037566 A1* | 2/2004 | Willebrand | ........ | H04B 10/1123 398/115 |
| 2006/0133617 A1* | 6/2006 | Minamizawa | ........ | H04L 9/0891 380/286 |
| 2006/0153375 A1* | 7/2006 | Yi | ....................... | H04L 63/0428 380/44 |
| 2007/0032098 A1* | 2/2007 | Bowles | ................. | H01M 10/46 439/11 |
| 2007/0208930 A1* | 9/2007 | Blank | .................. | H04L 9/0827 713/150 |
| 2008/0025265 A1* | 1/2008 | Soong | ................... | H04L 1/0002 370/335 |
| 2008/0059810 A1* | 3/2008 | Ishimoto | ............... | H04L 9/0822 713/193 |
| 2008/0199184 A1* | 8/2008 | Takeshita | ........... | H04B 10/1149 398/115 |
| 2009/0185140 A1* | 7/2009 | Chen | .................... | H04N 9/3111 353/31 |
| 2010/0002884 A1* | 1/2010 | Sherman | ............... | G06F 21/606 380/278 |
| 2011/0087879 A1* | 4/2011 | Chand | ..................... | H04K 3/25 713/153 |
| 2011/0110519 A1* | 5/2011 | Suzaki | .................. | H04L 9/0625 380/255 |
| 2011/0293090 A1* | 12/2011 | Ayaki | .................... | H04L 9/0891 380/200 |
| 2012/0087676 A1* | 4/2012 | Lim | ...................... | H04B 10/116 398/182 |
| 2012/0128367 A1* | 5/2012 | Yamada | ............. | H04B 10/1149 398/118 |
| 2014/0072119 A1* | 3/2014 | Hranilovic | ............ | H04L 9/3215 380/270 |
| 2014/0140703 A1* | 5/2014 | Sako | .................... | H04B 10/114 398/115 |
| 2014/0186026 A1* | 7/2014 | Oshima | ................ | H04B 10/116 398/25 |
| 2014/0186049 A1* | 7/2014 | Oshima | .............. | H04B 10/1143 398/118 |
| 2014/0186050 A1* | 7/2014 | Oshima | .............. | H04B 10/1143 398/118 |
| 2014/0186055 A1* | 7/2014 | Oshima | .............. | H04B 10/541 398/186 |
| 2014/0207517 A1* | 7/2014 | Oshima | ................ | H04N 5/2356 705/7.29 |
| 2014/0270794 A1* | 9/2014 | Rothenberg | ......... | H04B 10/116 398/118 |
| 2014/0286644 A1* | 9/2014 | Oshima | ................. | H04B 10/11 398/118 |
| 2014/0290138 A1* | 10/2014 | Oshima | ................. | H04B 10/11 49/25 |
| 2014/0294397 A1* | 10/2014 | Oshima | ........... | H04B 10/1143 398/118 |
| 2015/0146871 A1* | 5/2015 | Liu | ...................... | H04L 9/0852 380/256 |

\* cited by examiner

METHOD AND APPARATUS FOR DATA TRANSMISSION

CLAIM OF PRIORITY

This application claims priority under 35 U.S.C. § 119(a) to Korean Application Serial No. 10-2014-0134418, which was filed in the Korean Intellectual Property Office on Oct. 6, 2014, the entire content of which is hereby incorporated by reference.

TECHNICAL FIELD

The present disclosure relates to electronic devices, and more particularly to a method and apparatus for data transmission.

BACKGROUND

With the functional development of electronic devices, various functions can be performed by one electronic device. In connection this, the electronic device may not only perform a function of simply making a phone call with a counterpart or transmitting/receiving text messages but also access a web browser to execute various types of contents, execute games, or store important information of various users.

Further, the electronic device may form a network with neighboring devices. Accordingly, the electronic device may share data with the neighboring devices connected via the network. In general, the electronic device may use short-range communication to share the data. For example, the electronic device may exchange communications with the neighboring devices via WiFi, NFC, or Bluetooth.

SUMMARY

According to aspects of the disclosure, an electronic device is provided comprising: a visible light communication (VLC) transmitter; a radio transmitter; and at least one processor, configured to: control the radio transmitter to transmit a first data item to a receiving device; and control the VLC transmitter to transmit a second data item to the receiving device.

According to aspects of the disclosure, an electronic device is provided comprising: a visible light communication (VLC) receiver; a radio receiver; and at least one processor, configured to: receive a first data item via the radio receiver; and receive a second data item via the VLC receiver based on the first data item.

According to aspects of the disclosure, a method is provided comprising: generating a first data item and a second data item; transmitting the first data item to a receiving device via a radio receiver; and transmitting the second data item to the receiving device via a visual light communication (VLC) receiver.

According to aspects of the disclosure, a method is provided comprising: receiving a first data item via a radio receiver; and receiving a second data item via a VLC receiver based on the first data item.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
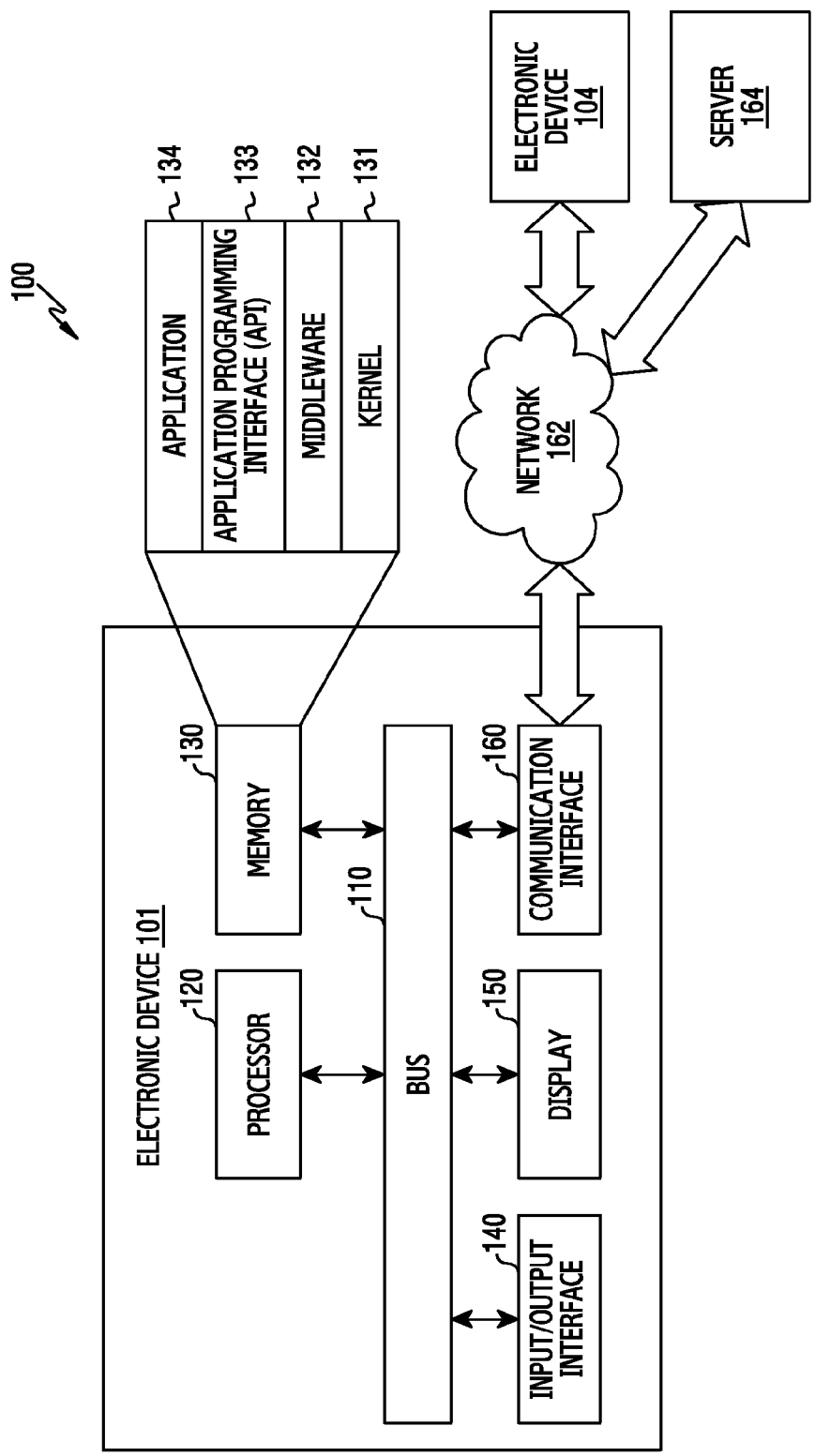
FIG. 1 is a diagram of an example of a network environment according to various embodiments.

Hereinafter, the present disclosure is provided with reference to the accompanying drawings. The examples provided in the disclosure may be changed variously and have various embodiments, and specific embodiments are exemplarily described and related detailed descriptions are made in the present specification. However, it should be understood that the disclosure is not limited to any specific embodiment and is intended to encompass all modifications and/or equivalents or substitutions that fall within the spirit and technical scope of the present disclosure. In the drawing, like reference numerals are used for like elements.

Expressions such as "include" or "may include", etc. that may be used throughout the disclosure indicate existence of a disclosed relevant function, operation, or element, etc., and do not limit additional one or more functions, operations, or elements, etc. Also, it should be understood that terminologies such as "include" or "have", etc. in the present disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

The conjunctions such as "and" and "or" may have overlapping meanings. For example, the expression "A or B" may mean "A only," "B only" or both A and B."

In the present disclosure, expressions such as "1st", "2nd", "first" or "second", etc. may modify various elements of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

A terminology used in the present disclosure is used for explaining only a specific embodiment and is not intended for limiting the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the present disclosure belongs. It should be understood that generally used terminologies defined by a dictionary have meaning coinciding with meaning on context of a related technology, and unless clearly defined in the present disclosure, they are not understood as an ideal or excessively formal meaning.

An electronic device according to the present disclosure may be a device including a communication function. For example, an electronic device may include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (e.g., a head-mounted-device (HMD) such as electronic glasses, an electronic clothing, an electronic bracelet, an electronic necklace, an electronic appcessory, an electronic tattoo, or a smartwatch).

According to certain embodiments, an electronic device may be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (e.g., Samsung Home-Sync™, Apple TV™, or Google TV™), game consoles, an electronic dictionary, an electronic key, a camcorder, or an electronic frame.

According to certain embodiments, an electronic device may include at least one of various medical devices (e.g., Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (e.g., a navigation device for a ship, a gyro compass, etc.), avionics, a security device, or a robot for an industrial use or a home use.

According to certain embodiments, an electronic device may include at least one of a furniture or a portion of a building/structure including a communication function, an electronic board, an electronic signature receiving device, a projector, or various measurement devices (e.g., waterworks, electricity, gas, or radio wave measuring device, etc.). An electronic device according to the present disclosure may be a combination of one or more of the above-described devices. Also, it is obvious to a person of ordinary skill in the art that the electronic device according to the present disclosure is not limited to the above-described devices.

Hereinafter, an electronic device according to various embodiments of the present disclosure is provided with reference to the accompanying drawings. A terminology of a user used in various embodiments may indicate a person who uses an electronic device or a device (e.g., an artificial intelligence electronic device) that uses the electronic device.

FIG. 1 is a diagram of an example of a network environment according to various embodiments. Referring to FIG. 1, the electronic device 101 may include a bus 110, a processor 120, a memory 130, an input/output (I/O) interface 140, a display 150, and a communication interface 160.

The bus 110 may be a circuit for connecting the above-described elements with each other, and transferring communication (e.g., a control message) between the above-described elements.

The processor 120 may include any combination of: one or more general-purpose processors (e.g., ARM-based processors, multi-core processors, etc.), a Field-Programmable Gate Array (FPGA), an Application-Specific Integrated Circuit (ASIC), a Digital Signal Processor (DSP), a Programmable Logic Device (PLD), and/or any other suitable type of processing circuitry.

The processor 120 may receive, for example, an instruction from the above-described other elements (e.g., the memory 130, the I/O interface 140, the display 150, or the communication interface 160, etc.) via the bus 110, decipher the received instruction, and execute an operation or a data process corresponding to the deciphered instruction.

The memory 130 may include any suitable type of volatile or non-volatile memory, such as Random Access Memory (RAM), Read-Only Memory (ROM), Network Accessible Storage (NAS), cloud storage, a Solid State Drive (SSD), etc. The memory 130 may store an instruction or data received from the processor 120 or other elements (e.g., the I/O interface 140, the display 150, or the communication interface 160, etc.), or generated by the processor 120 or other elements. The memory 130 may include, for example, programming modules such as a kernel 131, a middleware 132, an application programming interface (API) 133, or an application 134. The each of the programming modules may be configured using software, firmware, hardware, or a combination of two or more of these.

The kernel 131 may control or manage system resources (e.g., the bus 110, the processor 120, or the memory 130, etc.) used for executing an operation or a function implemented in the rest of the programming modules, for example, the middleware 132, the API 133, or the application 134. Also, the kernel 131 may provide an interface for allowing the middleware 132, the API 133, or the application 134 to access an individual element of the electronic device 101 and control or manage the same.

The middleware 132 may perform a mediation role so that the API 133 or the application 134 may communicate with the kernel 131 to give and take data. Also, in connection with task requests received from the applications 134, the middleware 132 may perform a control (e.g., scheduling or load balancing) for a task request using, for example, a method of assigning priority that may use a system resource (e.g., the bus 110, the processor 120, or the memory 130, etc.) of the electronic device 101 to at least one application 134.

The API 133 is an interface for allowing the application 134 to control a function provided by the kernel 131 or the middleware 132, and may include at least one interface or function (e.g., an instruction) for file control, window control, image processing, or character control, etc.

According to various embodiments, the application 134 may include a Short Message Service/Multimedia Messaging Service SMS/MMS application, an e-mail application, a calendar application, alarm application, a health care application (e.g., an application for measuring quantity of motion or blood sugar, etc.), or an environment information application (e.g., an application providing atmospheric pressure, humidity or temperature information, etc.). Additionally or alternatively, the application 134 may be an application related to information exchange between the electronic device 101 and an external electronic device (e.g., the electronic device 102 or 104). The application related to the information exchange may include, for example, a notification relay application for transferring specific information to the external electronic device or a device management application for managing the external electronic device.

For example, the notification relay application may include a function for transferring notification information generated from a different application (e.g., an SMS/MMS application, an e-mail application, a health care application, or an environment information application) of the electronic device 101 to an external electronic device (e.g., the electronic device 102 or 104). Additionally or alternatively, the notification relay application may, for example, receive notification information from an external electronic device (e.g., the electronic device 102 or 104) and provide the same to a user. The device management application may manage (e.g., install, delete, or update) a function (e.g., turn-on/turn-off of an external electronic device itself (or some constituent part) or luminance (or resolution) control of a display) of an external electronic device (e.g., the electronic device 102 or 104) communicating with the electronic device 101 and an application operating in the external electronic device or a service (e.g., a communication service or a message service) provided by the external electronic device.

According to various embodiments, the application 134 may include a designated application depending on an attribute (e.g., a kind of an electronic device) of the external electronic device (e.g., the electronic device 104). For example, in the case where the external electronic device is an MP3 player, the application 134 may include an application related to music reproduction. Similarly, in the case where the external electronic device is a mobile medical health care device, the application 134 may include an application related to health care. According to an embodiment, the application 134 may include at least one of an application designated in the electronic device 101 and an application received from the external electronic device (e.g., the server 106, the electronic device 102 or 104).

The I/O interface 140 may transfer an instruction or data input from a user via an I/O unit (e.g., a sensor, a keyboard, or a touchscreen) to the processor 120, the memory 130, or the communication interface 160 via the bus 110, for example. For example, the I/O interface 140 may provide data regarding a user's touch input via the touchscreen to the processor 120. Also, the I/O interface 140 may, for example, output an instruction or data received via the bus 110 from the processor 120, the memory 130, or the communication interface 160 via the I/O unit (e.g., a speaker or a display). For example, the I/O interface 140 may output voice data processed by the processor 120 to a user via a speaker.

The display 150 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 150 may display various types of contents (for example, text, images, videos, icons, or symbols) for users. The display 150 may include a touch screen, and may receive, for example, a touch, gesture, proximity, or hovering input by using an electronic pen or a part of the user's body.

According to an embodiment, the display 150 may display a contact list based on a priority of each of the contacts included in the contact list. For example, the priority of the contacts may be determined based on at least one of a transmission history, a transmission frequency, a transmission speed, a charging policy, intimacy, a counterpart's location, a schedule, or application preference.

According to an embodiment, the display 150 may display a service list based on a priority of each of the applications or services included in the service list. For example, the priority of the applications or services may be determined based on configuration information of a service provider, configuration information of a manufacturer, contact information, application preference, user preference, a use time point, a distance from a target to share contents, a transmission history, and a charging policy.

The communication interface 160 may connect communication between the electronic device 100 and an external device (for example, the electronic device 104 or the server 106). For example, the communication interface 160 may be connected to a network 162 via wireless communication or wired communication, and may communicate with an external device.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol.

The wireless communication may include at least one of, for example, WiFi, Bluetooth, BLE, Zigbee, Infrared (IR) communication, and ultrasonic communication as a short-range communication protocol 164.

The wired communication may include, for example, at least one of universal serial bus (USB), high definition multimedia interface (HDMI), recommended standard 232 (RS-232), and plain old telephone service (POTS).

The network 162 may include at least one of communication networks such as a computer network (for example, a LAN or a WAN), the Internet, and a telephone network.

The electronic devices 102 and 104 may be devices of the same type as that the electronic device 100 or devices of different types from that of the electronic device 100. According to an embodiment, the server 106 may include a group of one or more servers. According to various embodiments, all or some of the operations executed in the electronic device 100 may be carried out in another electronic device or a plurality of electronic devices (for example, the electronic device 102 or 104 and the server 106). According to an embodiment, when the electronic device 100 should perform some functions or services automatically or by a request, the electronic device 100 may make a request for performing at least some functions related to the functions or services to another device (for example, the electronic device 102 or 104, or the server 106) instead of performing the functions or services by itself or additionally. The electronic device (for example, the electronic device 102 or 104, or the server 106) may carry out the functions requested by the electronic device 100 or additional functions and provide results thereof to the electronic device 100. The electronic device 100 may provide the requested functions or services to another electronic device based on the received results or after additionally processing the received results. To this end, for example, cloud computing, distributed computing, or client-server computing technology may be used.

Figure 2:
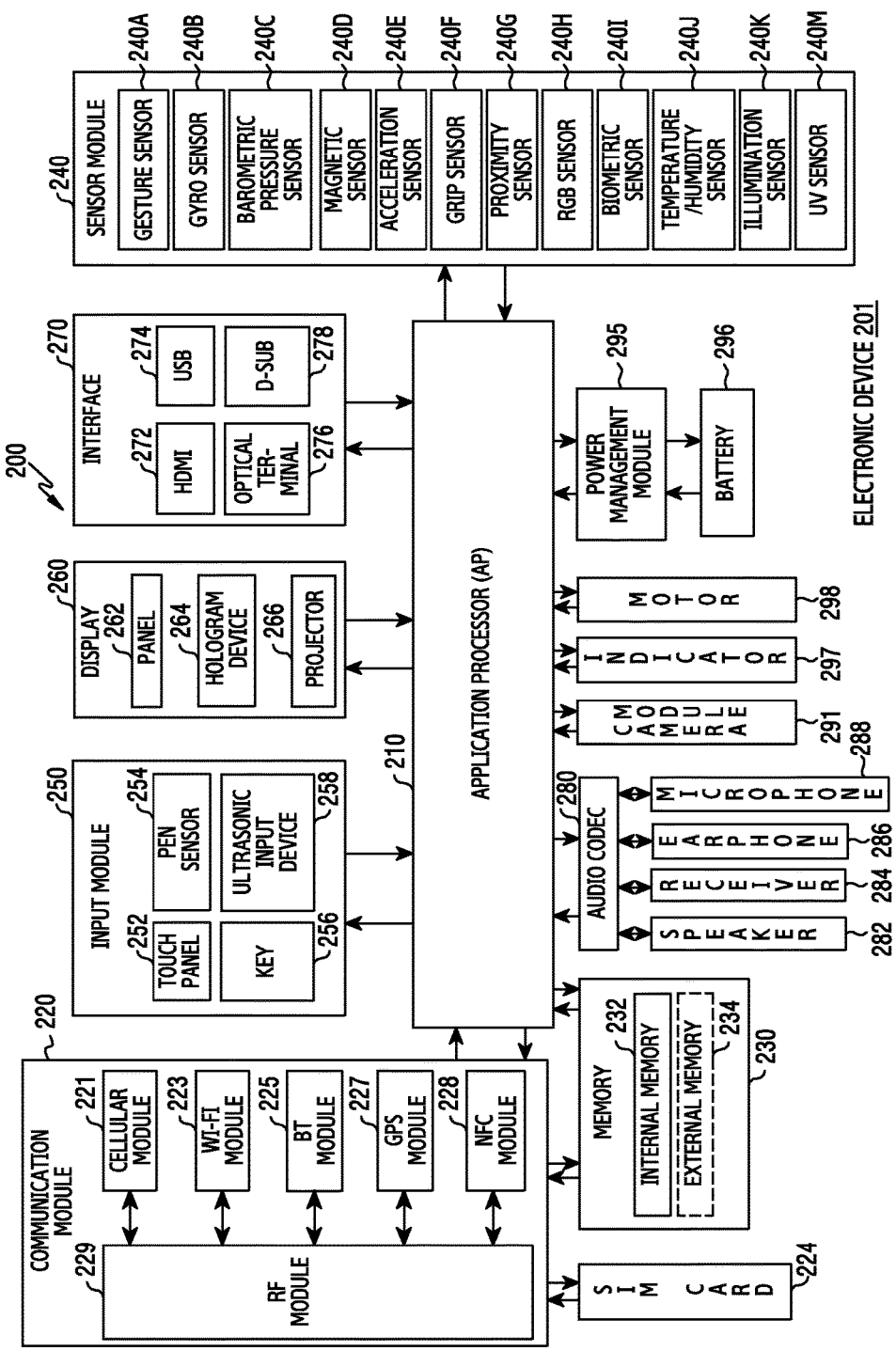
FIG. 2 is a block diagram of an example of an electronic device according to various embodiments.

FIG. 2 is a block diagram 200 illustrating an electronic device 201 according to various embodiments. The electronic device 201 may configure, for example, all or a portion of the electronic device 101 illustrated in FIG. 1. Referring to FIG. 2, the electronic device 201 may include one or more application processors (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, or a motor 298.

The AP 210 may drive an OS or an application to control a plurality of hardware or software elements connected to the AP 210, and perform various data processes including multimedia data and operations. The AP 210 may be implemented, for example, as a system on chip (SoC). According to an embodiment, the AP 210 may further include a graphic processing unit (GPU) (not shown).

The communication module 220 (e.g., the communication interface 160) may perform data transmission/reception in communication between the electronic device 201 (e.g., the electronic device 101) and other electronic devices (e.g., the electronic device 104 or the server 164) connected via a network. According to an embodiment, the communication module 220 may include a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identity module (e.g., a SIM card 224). According to an embodiment, the cellular module 221 may perform at least a portion of functions that may be provided by the AP 210. For example, the cellular module 221 may perform at least a portion of a multimedia control function.

According to an embodiment, the cellular module 221 may include a communication processor (CP). Also, the cellular module 221 may be, for example, implemented as a SoC. Though elements such as the cellular module 221 (e.g., a communication processor), the memory 230, or the power management module 295, etc. are illustrated as elements separated from the AP 210 in FIG. 2, according to an embodiment, the AP 210 may be implemented to include at least a portion (e.g., the cellular module 221) of the above-described elements.

According to an embodiment, the AP 210 or the cellular module 221 (e.g., a communication processor) may load an instruction or data received from at least one of a non-volatile memory and other elements connected thereto onto a volatile memory, and process the same. Also, the AP 210 or the cellular module 221 may store data received from at least one of other elements or generated by at least one of other elements in a non-volatile memory.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identity module, and may be inserted into a slot formed in a specific position of the electronic device. The SIM card 224 may include unique identify information (e.g., integrated circuit card identifier (ICCID)) or subscriber information (e.g., international mobile subscriber identity (IMSI)).

The memory 230 (e.g., the memory 130) may include a built-in memory 232 or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one-time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 201 via various interfaces. According to an embodiment, the electronic device 201 may further include a storage device (or a storage medium) such as a hard drive.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green, blue) sensor), a living body sensor 240I, a temperature/humidity sensor 240J, an illuminance sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

The display 260 (e.g., the display 150) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 140 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage power of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent the introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 210), for example, a booting state, a message state, or a charging state, etc. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

Figure 3A:
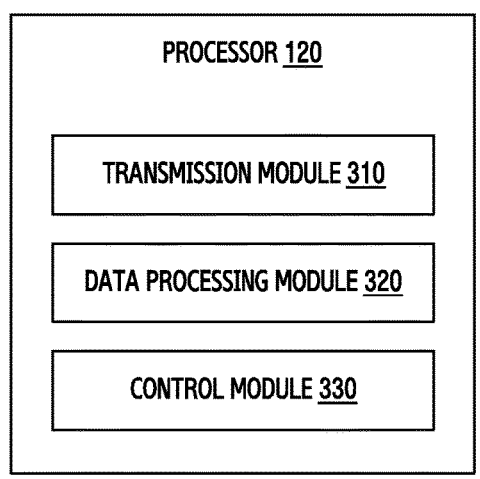
FIG. 3A is a block diagram of an example of a processor according to various embodiments.

FIG. 3A is a block diagram of an example of a processor according to various embodiments. The processor may be the component of the electronic device of FIG. 1. For example, the processor may perform an operation for transmitting data. As illustrated, the processor 120 may include a transmission module 310, a data processing module 320, or a control module 330.

The transmission module 310 may perform an operation for transmitting data to a second electronic device. According to various embodiments, the transmission module 310 may support visible light communication. According to an embodiment, the transmission module 310 may include a light emitting unit. For example, the light emitting unit may include one or more light emitting diodes.

According to various embodiments, the transmission module 310 may include a first transmission module and a second transmission module. According to an embodiment, the first transmission module may support the visible light communication, and the second transmission module may support a communication scheme different from that of the first transmission module. For example, the second transmission module may support at least one of various types of short-range communication schemes, for example, Bluetooth Low Energy (BLE), Bluetooth, Infrared Data Association (IRDA), Near Field Communication (NFC), Radio Frequency Identification (RFID), and WiFi. Alternatively, the second transmission module may support at least one of LTE, LTE-A, CDMA, WCDMA, UMTS, WiBro, and GSM as a cellular communication protocol.

The data processing module 320 may convert stored data into data supported by visible light communication. According to various embodiments, the data processing module 320 may convert data to be transmitted to the second electronic device into a control signal for controlling the light emitting unit. The control signal may be associated with at least one of flickering, intensity, and a color of emitted light.

According to an embodiment, the data processing module 320 may cause the control module to transmit data in accordance with a predefined light emission pattern (for example, a flickering order, a change in the intensity of light, or a change in a color of emitted light). For example, when data is fragmented into three blocks (for example, a first block, a second block, and a third block) and then the data is transmitted based on a light emission pattern in which color of the emitted light is changed in an order of red, green, and blue, the data processing module 320 may generate the control signal such that the first block is transmitted in the red band, the second block is transmitted in the green band, and the third block is transmitted in the blue band.

According to another embodiment, the data processing module 320 may generate the control signal in order to transmit the data according to a light emission state (for example, a light emission or extinguishing state, a color of emitted light, or a quantity of emitted light). For example, when it is assumed that the data is transmitted in a state where the data or data block is emitted in the blue, the data processing module 320 may generate the control signal such that the data or data block to be transmitted is transmitted only in a state where the data or data block is emitted in the blue. According to various embodiments, the data processing module 320 may not transmit the data, which is desired to be transmitted, in states other than the defined light emission state (for example, state where light or green is emitted).

According to various embodiments, the data processing module 320 may generate the control signal according to a transmission state of the data. According to an embodiment, the data processing module 320 may define a light emission pattern or a light emission state corresponding to a data transmission state (for example, a state where the transmission starts, the transmission is being performed, or the transmission ends) and generate the control signal such that the light emission pattern or the light emission state is changed according to a change in the data transmission state. For example, the data processing module 320 may generate the control signal, which applies a first light emission pattern or a first light emission state to the light emitting unit at a time point when the data transmission starts and applies a second light emission pattern or a second light emission state to the light emitting unit while the data is being transmitted. As described above, the light emission pattern may be associated with the flickering order, the change in the intensity of light, and the change in the color of emitted light, and the light emission state may be associated with the light emission or extinguishing state, the color of emitted light, and the intensity of emitted light.

According to various embodiments, the data processing module 320 may generate the control signal in order to transmit the data according to a data level. According to various embodiments, the data level is associated with at least one of data importance, priority for the data or frequency of use for the data. According to an embodiment, the data processing module 320 may define a light emission pattern or a light emission state corresponding to the data level and generate the control signal such that the light emission pattern or the light emission state is changed according to the level of data to be transmitted. For example, the data processing module 320 may generate the control signal, which applies a first light emission pattern or a first light emission state to the light emitting unit when data having a high level is transmitted and applies a second light emission pattern or a second light emission state to the light emitting unit when data having a low level is transmitted.

According to various embodiments, the data processing module 320 may provide information related to the light emission pattern or the light emission state to the second electronic device. For example, the data processing module 320 may transmit an indication of the light emission pattern or the light emission state to the second electronic device.

According to various embodiments, the data processing module 320 may transmit at least one of data (for example, encrypted data) and information related to the data (for example, a decryption key) via a visible light communication protocol.

According to various embodiments, when encrypted data is transmitted, the data processing module 320 may define a light emission pattern or a light emission state associated with the data transmission and transmit the light emission pattern or the light emission state to the second electronic device such that the light emission pattern or the light emission state is used as a decryption key of the encrypted data. The data processing module 320 may define a light emission pattern of the light emitting unit according to a predetermined cycle. For example, the data processing module 320 may define the light emission pattern by using bit information on an operation cycle of the light emitting unit. For example, the light emission may be defined as "1" and the light extinguishing may be defined as "0". In the operation during three cycles, the light emission pattern may be "111" when the light is emitted in all the three cycles, and the light emission pattern may be "110" when the light is emitted in the first and second cycles and is extinguished in the third cycle.

The control module 330 may transmit the data converted by the data processing module 320 to the second electronic device.

According to an embodiment, the control module 330 may transmit the data converted by the data processing module 320 to the second electronic device via the first transmission module. For example, the control module 330 may control the first transmission module to transmit visible light based on the control signal generated by the data processing module 320.

According to another embodiment, the control module 330 may transmit the data converted by the data processing module 320 to the second electronic device via the first transmission module and the second transmission module. For example, the control module 330 may control the second transmission module to transmit first data (for example, encrypted data) to the second electronic device and control the first transmission module to transmit second data (for example, a decryption key) in visible light based on the control signal generated by the data processing module 320.

Figure 3B:
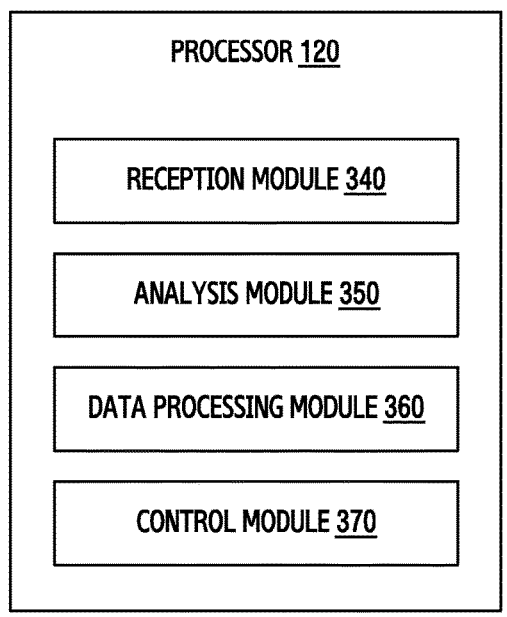
FIG. 3B is a block diagram of an example of a processor according to various embodiments

FIG. 3B is a block diagram of an example of a processor according to various embodiments. The processor may be the component of the electronic device of FIG. 1. For example, the processor may process an operation for receiving data.

According to various embodiments, the processor 120 may include a reception module 340, an analysis module 350, a data processing module 360, or a control module 370.

The reception module 340 may receive data from a second electronic device. According to various embodiments, the reception module 340 may support visible light communication. According to an embodiment, the reception module 340 may include a light receiving unit. For example, the light receiving unit may include one or more photo diodes for converting light energy into electrical energy.

According to various embodiments, the reception module 340 may include a first reception module and a second reception module. According to an embodiment, the first reception module may support the visible light communication, and the second reception module may support a communication scheme different from that of the first reception module. For example, the second reception module may support at least one of various types of short-range communication schemes, for example, Bluetooth Low Energy (BLE), Bluetooth Infrared Data Association (IRDA), Near Field Communication (NFC), Radio Frequency Identification (RFID), and WiFi. Alternatively, the second reception module may support at least one of LTE, LTE-A, CDMA, WCDMA, UMTS, WiBro, and GSM as a cellular communication protocol.

The analysis module 350 may identify a light emission pattern (for example, a flickering order, a change in the intensity of light, and a change in a color of emitted light) or a type of modulation that is to be used for the transmission of data. According to various embodiments, the analysis module 350 may receive information related to the light emission pattern or the light emission state from the second electronic device and identify the light emission pattern or the light emission state of the second electronic device based on the received information.

The data processing module 360 may reconstruct an electrical signal received by the reception module 340 to data. According to various embodiments, the data processing module 360 may receive visible light from the second electronic device and reconstruct the data to be data transmitted by the second electronic device.

According to various embodiments, the data processing module 360 may reconstruct data based on the light emission pattern or the light emission state of the second electronic device. For example, when the light emission pattern in which a color of emitted light is changed in an order of red, green, and blue is defined by the second electronic device, the data processing module 360 may sequentially receive first data transmitted from the second electronic device in the red band, second data transmitted from the second electronic device in the green band, and third data transmitted from the second electronic device in the blue band and reconstruct the data. Alternatively, when the light emission state where the light is emitted in the blue is defined by the second electronic device, the data processing module 360 may receive data only in a state where the second electronic device emits only the blue and reconstruct the data. According to various embodiments, the data processing module 360 may not receive the data in states (for example, a state where red or blue is emitted) other than the defined light emission state.

According to various embodiments, when receiving encrypted data, the data processing module 360 may use an indication of a light emission pattern or a light emission state associated with the received data as a decryption key because the indication of the light emission pattern or light emission state may be necessary for reconstructing the data from light signals received by the data processing module 360

The control module 370 may receive data transmitted from the second electronic device.

According to an embodiment, the control module 370 may receive data transmitted from the second electronic device via the first reception module. For example, the control module 370 may control the first reception module to receive visible light emitted from the second electronic device.

According to another embodiment, the control module 370 may receive data transmitted from the second electronic device via the first reception module and the second reception module. For example, the control module 370 may control the second reception module to receive first data (for example, encrypted data) transmitted from the second electronic device and control the second reception module to receive second data (for example, a decryption key) transmitted from the second electronic device.

Although the processor for performing the transmission operation and the processor for performing the reception operation are separately described in FIGS. 3A and 3B, the processor according to various embodiments of the present disclosure may perform both the transmission and reception operations. For example, the processor may include both the transmission module and the reception module.

Figure 4:
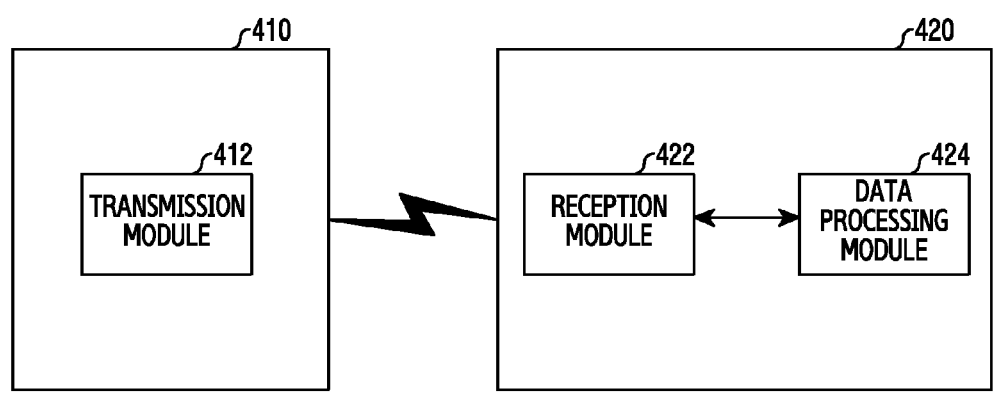
FIG. 4 is a diagram of an example of a system according to various embodiments.

FIG. 4 is a diagram of an example of a system according to various embodiments. According to various embodiments, a first electronic device 410 may include a transmission module 412 supporting visible light communication, and a second electronic device 420 may include a reception module 422 and a data processing module 424. According to various embodiments, the first electronic device 410 may convert data to be transmitted into data supported by visible light communication and transmit the converted data to the second electronic device 420 via the transmission module 412.

According to various embodiments, the transmission module 412 transmits visible light to the second electronic device 420, so that sniffing by a third party can be prevented by a characteristic that the visible light is identified by user's eyes and a characteristic that the light has feature of being straight. According to an embodiment, since the first electronic device 410 transmits data to be transmitted to the second electronic device 420 by using visible light, exposure to sniffing by a third party is detected, and the user can previously prevent hacking easily by covering the transmission module 412 with the back of user's hand.

According to various embodiments, the reception module 422 of the second electronic device 420 may detect light and then convert the detected light into an electrical signal.

According to various embodiments, the data processing module 424 of the second electronic device 420 may reconstruct the electrical signal converted by the reception module 422 to data.

Figure 5:
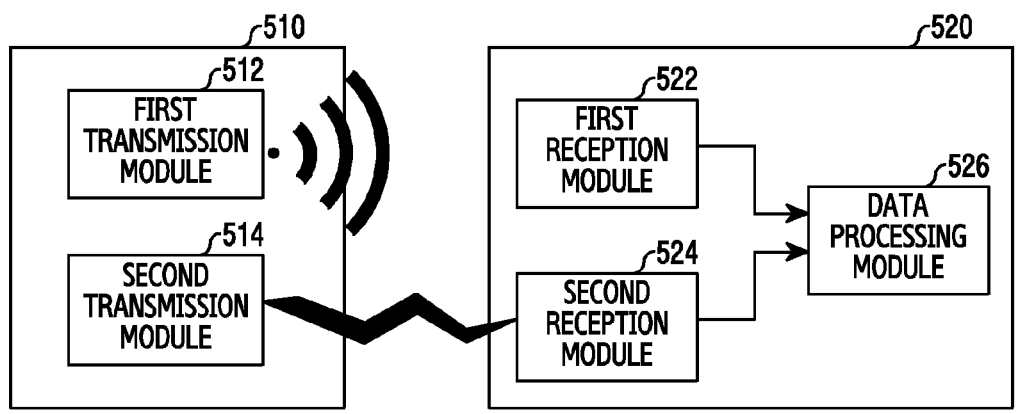
FIG. 5 is a diagram of an example of a system according to various embodiments.

FIG. 5 is a diagram of an example of a system according to various embodiments. According to various embodiments, a first electronic device 510 may include a first transmission module 512 and a second transmission module 514, and a second electronic device 520 may include a first reception module 522, a second reception module 524, and a data processing module 526.

According to an embodiment, the first transmission module 512 may include any suitable type of radio transmitter, such as a stand-alone radio transmitter or a radio transmitter that is part of a radio transceiver. By way of example the radio transmitter may include a short-range radio transmitter (for example, a Bluetooth Low Energy (BLE) transmitter, Bluetooth transmitter, Infrared Data Association (IRDA) transmitter, Near Field Communication (NFC) transmitter, Radio Frequency Identification (RFID) transmitter, or WiFi transmitter) or a long-range transmitter (for example, LTE transmitter, LTE-A transmitter, CDMA transmitter, WCDMA transmitter, UMTS transmitter, WiBro transmitter, or GSM transmitter).

The second reception module 524 may include any suitable type of radio receiver, such as a stand-alone radio receiver or a radio receiver that is part of a radio transceiver. By way of example the radio receiver may include a short-range radio receiver (for example, a Bluetooth Low Energy (BLE) receiver, Bluetooth receiver, Infrared Data Association (IRDA) receiver, Near Field Communication (NFC) receiver, Radio Frequency Identification (RFID) receiver, or WiFi receiver) or a long-range receiver (for example, LTE receiver, LTE-A receiver, CDMA receiver, WCDMA receiver, UMTS receiver, WiBro receiver, or GSM receiver).

The second transmission module 514 may include any suitable type of visible light communication (VLC) transmitter, such as a standalone VLC transmitter or a VLC transmitter that is part of a VLC transceiver. The second reception module 514 may include any suitable type of visible light communication (VLC) receiver, such as a standalone VLC receiver or a VLC receiver that is part of a VLC transceiver.

According to various embodiments, the first electronic device 510 may transmit encrypted data to the second electronic device 520 via the first transmission module 512. Further, the first electronic device 510 may transmit a decryption key, which can decrypt the encrypted data, to the second electronic device 520 via the second transmission module 514. For example, when the first electronic device 510 desires to transmit data A to the second electronic device 520, if the first electronic device 510 encrypts the data A to be data A' for security reasons and generates a decryption key A", which can decrypt the encrypted data A', the first electronic device 510 may transmit the decryption key A" to the second electronic device 520 via visible light communication and transmit the encrypted data to the second electronic device 520 via wireless communication. According to various embodiments, the second electronic device 520 may receive the encrypted data transmitted from the first electronic device 510 via the first reception module 522 and receive the decryption key via the second reception module 524. The decryption key and the encrypted data received via the first reception module 522 and the second reception module 524 may be provided to the data processing module 526.

According to various embodiments, the data processing module 526 of the second electronic device 520 may decrypt the encrypted data by using the decryption key. For example, the data processing module 526 may reconstruct the data A transmitted by the first electronic device by decrypting the encrypted data A' by using the decryption key A".

Although it has been described that the decryption key is transmitted to the second electronic device via visible light communication and the encrypted data is transmitted to the second electronic device via short-range communication or cellular communication in FIG. 5, the decryption key may be transmitted to the second electronic device via the short-range communication or cellular communication and the encrypted data may be transmitted to the second electronic device via the visible light communication in various embodiments.

Figure 6:
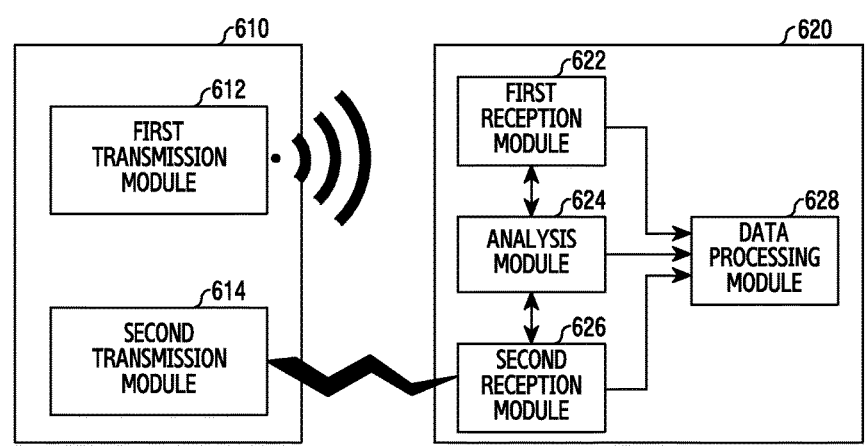
FIG. 6 is a diagram of an example of a system according to various embodiments.

FIG. 6 is a diagram of an example of a system according to various embodiments. According to various embodiments, a first electronic device 610 may include a first transmission module 612 and a second transmission module 614, and a second electronic device 620 may include a first reception module 622, an analysis module 624, a second reception module 626, and a data processing module 628. According to an embodiment, the first transmission module 612 and the first reception module 622 may support short-range communication or cellular communication, and the second transmission module 614 and the second reception module 626 may support visible light communication. In some embodiments, the first transmission module 612 may have the same structure as the first transmission module 512. In some embodiments, the second transmission module 614 may have the same structure as the second transmission module 514. In some embodiments, the first reception module 622 may have the same structure as the first reception module 522. In some embodiments, the second reception module 626 may have the same structure as the second reception module 514.

According to various embodiments, the first electronic device 610 may transmit encrypted data to the second electronic device 620 via the first transmission module 612. According to various embodiments, the first electronic device 610 may provide the second electronic device 620 with light emission information related to transmission of a decryption key via the first transmission module 612. The light emission information may include any suitable type of signaling related to the transmission of the encrypted data. For example, the light emission information may be associated with the intensity of emitted light, quantity of emitted light and a color of emitted light. According to an embodiment, the light emission information may mean that the decryption key is transmitted based on a predefined light intensity. For example, data transmitted in accordance with light intensity corresponding to a first level may be associated with the decryption key. According to another embodiment, the light emission information may mean that the decryption key is transmitted based on a predefined color of emitted light. For example, data transmitted in accordance with light emission of a first color may be associated with the decryption key. According to various embodiments, the first electronic device 610 may provide the second electronic device 620 with encrypted data including the light emission information. For example, the light emission information may be added to a header of the encrypted data. According to various embodiments, the first electronic device 610 may transmit a decryption key, which can decrypt the encrypted data, to the second electronic device 620 by controlling the second transmission module 614 based on the light emission information.

According to various embodiments, the second electronic device 620 may receive the encrypted data and the light emission information from the first electronic device 610 via the first reception module 622, and the analysis module 624 may analyze the light emission information.

According to various embodiments, the second electronic device may receive the decryption key by controlling the second reception module 626 based on a result of the analysis by the analysis module 624. According to an embodiment, the analysis result may be associated with the color of emitted light and may be one piece of RGB information. For example, when the light emission information is associated with red, the second electronic device 620 may use data, which is received according to emission of a red light emitting unit by the first electronic device 610, as the decryption key. According to an embodiment, the second electronic device 620 may ignore data, which is received according to emission of other lighting emitting units except for the red light emitting unit.

In other words, in some embodiments, the light emission information may specify a proper subset of all available color bands that is to be used for transmission of data. In such instances, the second electronic device reconstitute the data based on protocol data units (PDUs) received using the specified' color bands while discarding (or otherwise ignoring) information that is received over the remaining color bands.

According to various embodiments, the decryption key and the encrypted data received via the first reception module 622 and the second reception module 626 may be provided to the data processing module 628.

According to another embodiment, the first electronic device 610 may transmit the decryption key based on a light emission pattern. The light emission pattern may be expressed as "1" when each light emitting unit is emitted and expressed as "0" when each light emitting unit is extinguished. For example, the light emission pattern may be defined as "10111", "11100", and "11111" with respect to red, green, and blue light emitting units, respectively. The pattern "10111" of the red light emitting unit may correspond to a pattern in which the light is emitted in a first cycle, the light is extinguished in a second cycle, and the light is emitted in third to fifth cycles. The pattern "11100" of the green light emitting unit may correspond to a pattern in which the light is emitted in first to third cycles and the light is extinguished in fourth and fifth cycles. The pattern "11111" of the blue light emitting unit may correspond to a pattern in which the light is emitted in first to fifth cycles.

According to various embodiments, the first electronic device 610 may transmit the decryption key corresponding to a predefined light emission pattern to the second electronic device 620. For example, the first electronic device 610 may transmit the decryption key corresponding to the first cycle in which all of the red light emitting unit, the green light emitting unit, and the blue light emitting unit are emitted, and the second electronic device 620 may receive the decryption key based on the light emission pattern.

Figure 7:
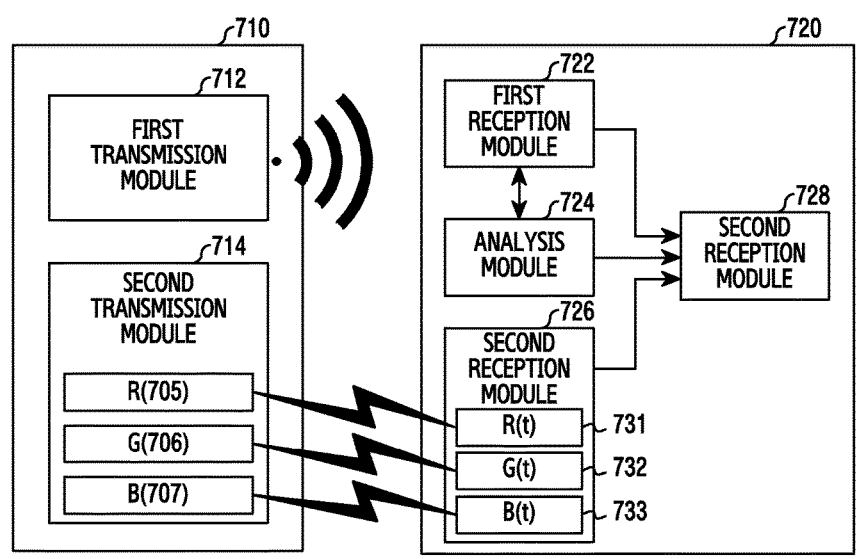
FIG. 7 is a diagram of an example of a system, according to various embodiments.

FIG. 7 is a diagram of an example of a system according to various embodiments. In some embodiments, the first transmission module 612 may have the same structure as the first transmission module 512. In some embodiments, the second transmission module 614 may have the same structure as the second transmission module 514. In some embodiments, the first reception module 622 may have the same structure as the first reception module 522. In some embodiments, the second reception module 626 may have the same structure as the second reception module 514.

According to various embodiments, a first electronic device 710 may include a first transmission module 712 and a second transmission module 714, and a second electronic device 720 may include a first reception module 722, an analysis module 724, a second reception module 726, and a data processing module 728. According to an embodiment, the first transmission module 712 and the first reception module 722 may support short-range communication or cellular communication, and the second transmission module 714 and the second reception module 726 may support visible light communication.

According to various embodiments, the first electronic device 710 may transmit a light emission pattern of the first electronic device 710 to the second electronic device 720 via the first transmission module 712. The light emission pattern may be associated with a change in a quantity of light and a change in a color of emitted light. According to an embodiment, the light emission pattern may mean that data is transmitted based on a predetermined order of a change in the color of emitted light. For example, when data is divided into three blocks (for example, a first block, a second block, and a third block) and then the data is transmitted based on a light emission pattern in which the color of emitted light is changed in an order of red, green, and blue, the first block may be transmitted in the red band, the second block may be transmitted in the green band, and the third block may be transmitted in the blue band.

According to various embodiments, the first electronic device 710 may transmit encrypted data to the second electronic device 720 by controlling the second transmission module 714 based on the light emission pattern.

According to an embodiment, the first electronic device 710 may transmit the data by controlling R(t) 705, G(t) 706, and B(t) 707 to be emitted according to the defined light emission pattern. For example, the first electronic device 710 may divide one data into a plurality of blocks, map each block to a different color band, and transmit the block to the second electronic device 720 by using the block's respective color band.

According to various embodiments, the second electronic device 720 may provide one piece of data, which is generated by combining a plurality of pieces of data based on the light emission pattern, received via the second module 726 to the data processing module 728. For example, the second electronic device 720 may receive data which is received via R(t) 731, G(t) 732, and B(t) 733 based on the light emission pattern. In other words, the second electronic device 720 may receive data via R(t) 731, G(t) 732, and B(t) 733 according to a predefined order based on the light emission pattern.

According to various embodiments of the present disclosure, a first electronic device may include: a processor for generating encrypted data and a decryption key, which can decrypt the encrypted data; and a communication module for transmitting one of the encrypted data and the decryption key to a second electronic device via visible light communication.

The communication module may transmit the encrypted data to the second electronic device via wireless communication and transmit the decryption key to the second electronic device via visible light communication.

The first electronic device may further include a process for inserting an order code of a combination of RGB colors into a header part of the encrypted data and determining the order code of the combination of the RGB colors as the decryption key.

The processor may insert the order code of the combination of the RGB colors into the header part of the encrypted data and divide the encrypted data except for the header part into three pieces of data.

The first electronic device may further include a communication module for transmitting only the header part to the second electronic device via the wireless communication and transmitting three pieces of divided data to the second electronic device in the red, green, and blue color bands, respectively.

According to various embodiments of the present disclosure, a second electronic device may include: a communication module for receiving one of encrypted data and a decryption key, which can decrypt the encrypted data, from a first electronic device via visible light communication; and a processor for decrypting the encrypted data by using the received decryption key.

The communication module may receive the encrypted data from the first electronic device via wireless communication and receive the decryption key to the first electronic device via the visible light communication.

The second electronic device may further include a processor for reading an order code of a combination of RGB colors inserted into a header part of the encrypted data and decrypting an order code of a combination of RGB colors included in the decryption key by using the read order code of the combination of the RGB colors.

The communication module may receive only the header part of the encrypted data from the first electronic device via the wireless communication and receive three pieces of data divided from the encrypted data except for the header part from the first electronic device in the red, green, and blue color bands, respectively.

The second electronic device may further include a process for identifying that the order code of the combination of the RGB colors is inserted into the header part of the encrypted data.

According to various embodiments, a first electronic device may include: a first transmission module for supporting visible light communication; a second transmission module for supporting wireless communication; and a data processing module for controlling the first transmission module to transmit at least a part of transmission data to a second electronic device and controlling a second transmission module to transmit data, which is not transmitted via the wireless communication among the transmission data, to the second electronic device.

According to various embodiments, the data processing module may generate light emission information related to data transmitted using the first transmission module and transmit the generated light emission information to the second electronic device by using the second transmission module.

According to various embodiments, the light emission information may be related to at least one of flickering, a quantity of emitted light, and a color of emitted light of a light emitting unit of the first electronic device.

According to various embodiments, the data processing module may generate light emission information related to a transmission order of a plurality of pieces of transmission data transmitted via the first transmission module.

According to various embodiments, the data processing module may generate light emission information related to a light emission state at a time point when data is transmitted.

According to various embodiments, the data processing module may generate light emission information related to a level of data transmitted using the second transmission module.

According to various embodiments, the data processing module may generate light emission information related to a transmission state of data transmitted using the second transmission module.

According to various embodiments, a second electronic device may include: a first reception module for supporting visible light communication; a second reception module for supporting wireless communication; and a data processing module for receiving a part of transmission data by using the first reception module, receiving data, which is not transmitted via the wireless communication among the transmission data, by using the second reception module, and reconstructing transmission data transmitted by a first electronic device based on the data received using the first reception module and the second reception module.

According to various embodiments, the data processing module may receive light emission information associated with data transmitted using the second reception module via visible light communication and receive data by controlling the first reception module based on light emission information.

According to various embodiments, the data processing module may identify a data transmission order based on the light emission information and generate the data received via the first reception module as one piece of data based on the data transmission order.

According to various embodiments, the data processing module may identify a light emission state of the first electronic device transmitting data based on the light emission information and receive data by detecting light emission of the first electronic device based on the light emission state.

Figure 8A:
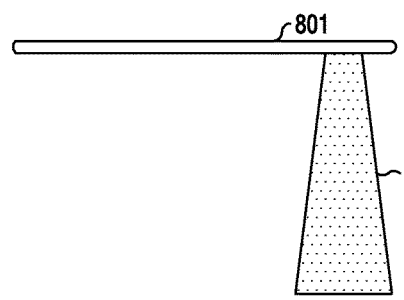
FIG. 8A is a diagram illustrating an example of a transmission operation according to various embodiments.
Figure 8B:
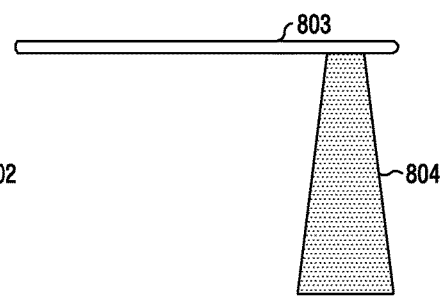
FIG. 8B is a diagram illustrating an example of a transmission operation according to various embodiments
Figure 8C:
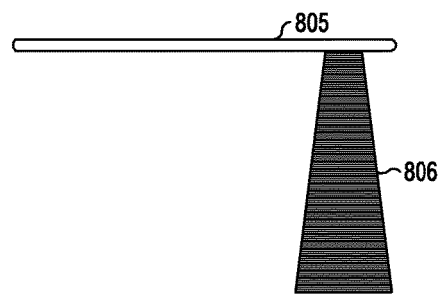
FIG. 8C is a diagram illustrating an example of a transmission operation according to various embodiments

FIGS. 8A to 8C are diagrams illustrating different examples of transmission operation according to various embodiments. According to various embodiments, the electronic device may perform visible light communication by using visible light emitted by a visible light transmitter included in the electronic device. According to an embodiment, the electronic device may transmit data, which is desired to be transmitted, by using the visible light communication.

According to various embodiments, in the visible light communication, the user may identify a data transmission state via the user's eyes, so that the user can make an intuitive determination when the user desires to transmit important data via the visible light communication.

According to various embodiments, in the visible light communication, a direction or a progress situation of the data in which the visible light is transmitted can be directly identified by the user's eyes, so that the user convenience can be improved.

According to various embodiments, the visible light communication may be easily stopped as the user needs. According to an embodiment, when the user desires to stop the visible light communication, the user can very simply stop the visible light communication by blocking the visible light transmitter of the electronic device. Hereinafter, an embodiment of distinguishing between data via different colors according to data importance will be described with reference to FIGS. 8A to 8C.

For example, when the electronic device transmits data A to C via visible light communication, it is determined that data importance of data C is highest, data importance of data B is next highest, and data importance of data A is lowest.

According to above-described embodiment, when the electronic device 801 transmits the data A having the lowest data importance via visible light communication, the electronic device 801 may transmit the data A by using a color 802 corresponding to the lowest data importance.

According to another embodiment, when the electronic device 805 transmits the data C having the highest data importance via visible light communication, the electronic device 805 may transmit the data C by using a color 806 corresponding to the highest data importance.

According to another embodiment, when the electronic device 803 transmits the data B having the intermediate data importance between those of the data A and the data C via visible light communication, the electronic device 803 may transmit the data B by using an intermediate color 804 corresponding to a color between the color 802 corresponding to the lowest data importance and the color 806 corresponding to the highest data importance.

Figures 9A, 9B:
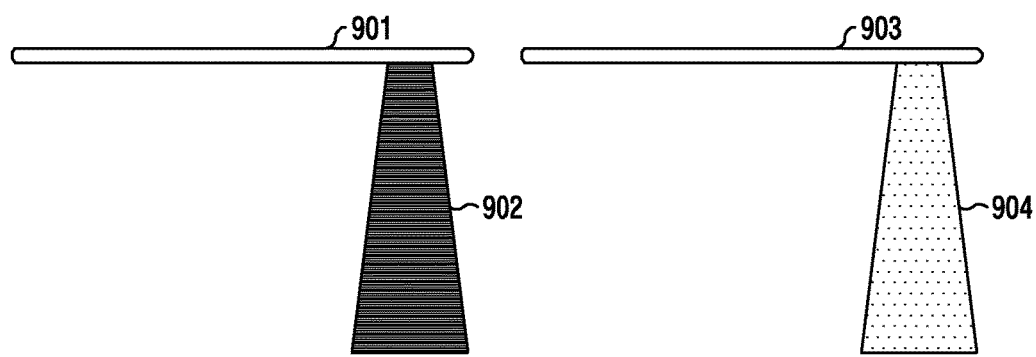
FIG. 9A is a diagram illustrating an example of a transmission operation according to various embodiments.
FIG. 9B is a diagram illustrating an example of a transmission operation according to various embodiments.

FIGS. 9A and 9B are diagrams illustrating an example of a transmission operation according to various embodiments. According to various embodiments, the electronic device may perform visible light communication by using visible light emitted by a visible light transmitter included in the electronic device. According to an embodiment, the electronic device may transmit data, which is desired to be transmitted, by using the visible light communication.

According to various embodiments, the electronic device may inform the user of the data transmission state of the electronic device by using a color of visible light emitted from the electronic device. According to an embodiment, when the electronic device starts data transmission, the electronic device may perform visible light communication by using a color (for example, a deep color) associated with the data transmission. According to an embodiment, when the electronic device ends data transmission within a preset time, the electronic device may perform visible light communication by using a color (for example, a pale color) associated with the data transmission end.

For example, as illustrated in FIGS. 9A and 9B, when the electronic device transmits data A, the data A to be transmitted is scheduled to be transmitted for 10 minutes at a preset speed. According to the above-described embodiment, the electronic device 901 may perform visible light communication by using a deepest visible light color 902 for about 1 minute after initial transmission starts. Further, the electronic device may perform visible light communication by using a palest visible light color 904 for about 1 minute before the transmission is completed.

Figure 10A:
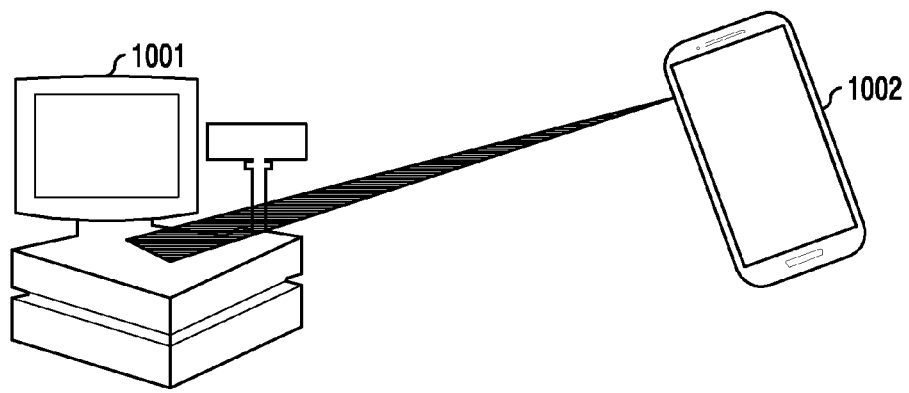
FIG. 10A is a diagram illustrating an example of a transmission operation according to various embodiments.
Figure 10B:
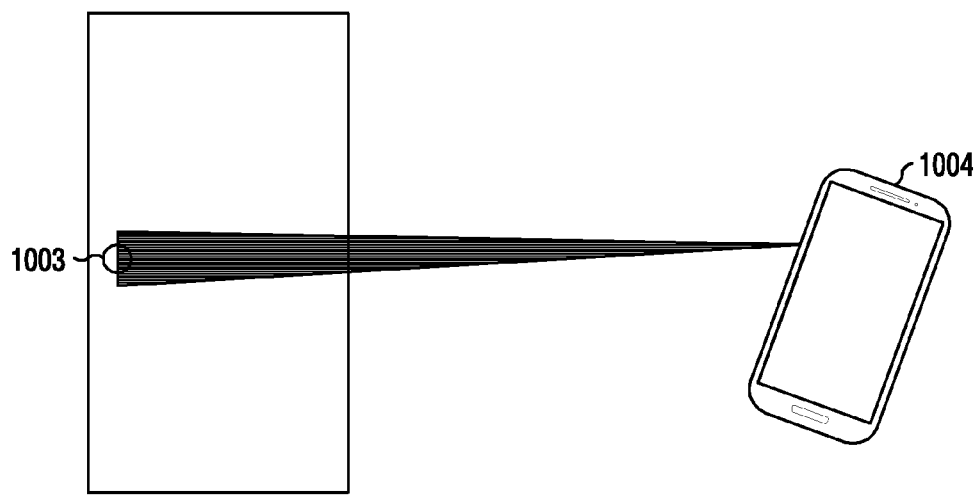
FIG. 10B is a diagram illustrating an example of a transmission operation according to various embodiments.

FIGS. 10A and 10B are diagrams illustrating an example of a transmission operation according to various embodiments. According to various embodiments, when the electronic device transmits security-sensitive data, the electronic device may use visible light communication. For example, as illustrated in FIG. 10A, a case where the user of the electronic device finishes a meal in a restaurant and then pays by using an application installed in the electronic device will be described.

In this example, the electronic device 1002 may execute an application related to the payment by a user's selection and then perform a preset user authentication process such as iris recognition, fingerprint recognition, and password input. According to an embodiment, when the electronic device 1002 determines that the user authentication is successful, the electronic device 1002 may transmit data related to payment information to a payment reader 1001 by using visible light communication based on a user's selection. That is, the user may easily pay via the visible light communication while improving security.

In another example, as illustrated in FIG. 10B, a case where the user goes out and then unlocks a front door by using visible light communication will be described. In the above-described example, the electronic device 1004 may execute an application related to the unlocking by a user's selection and then perform a preset user authentication process such as iris recognition, fingerprint recognition, and password input. According to an embodiment, when the electronic device 1004 determines that the user authentication is successful, the electronic device 1004 may transmit data related to the unlocking of the front door to a visible light receiving unit 1003 of the front door by using visible light communication based on a user's selection. That is, the user may easily unlock the locked door via the visible light communication while improving security.

Figure 11:
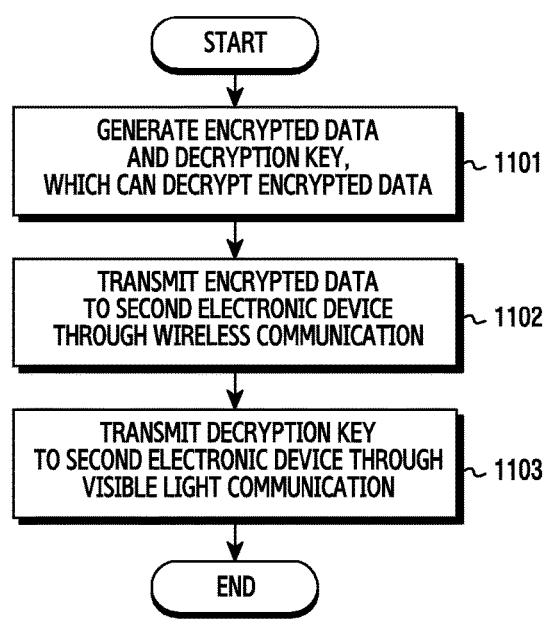
FIG. 11 is a flowchart of an example of a process according to various embodiments.

FIG. 11 is a flowchart of an example of a process according to various embodiments.

In operation 1101, the first electronic device may generate encrypted data and a decryption key, which can be used to decrypt the encrypted data. According to an embodiment, the first electronic device may generate encrypted data A' generated by encrypting data A and a decryption key A", which can decrypt the encrypted data.

In operation 1102, the first electronic device may transmit the encrypted data to the second electronic device via wireless communication. According to an embodiment, the first electronic device may transmit the encrypted data A' generated by encrypting the data A to the second electronic device via wireless communication. In operation 1103, the first electronic device may transmit the decryption key to the second electronic device via visible light communication. According to an embodiment, the first electronic device may transmit the decryption key A", which can decrypt the data A', to the second electronic device via visible light communication.

Figure 12:
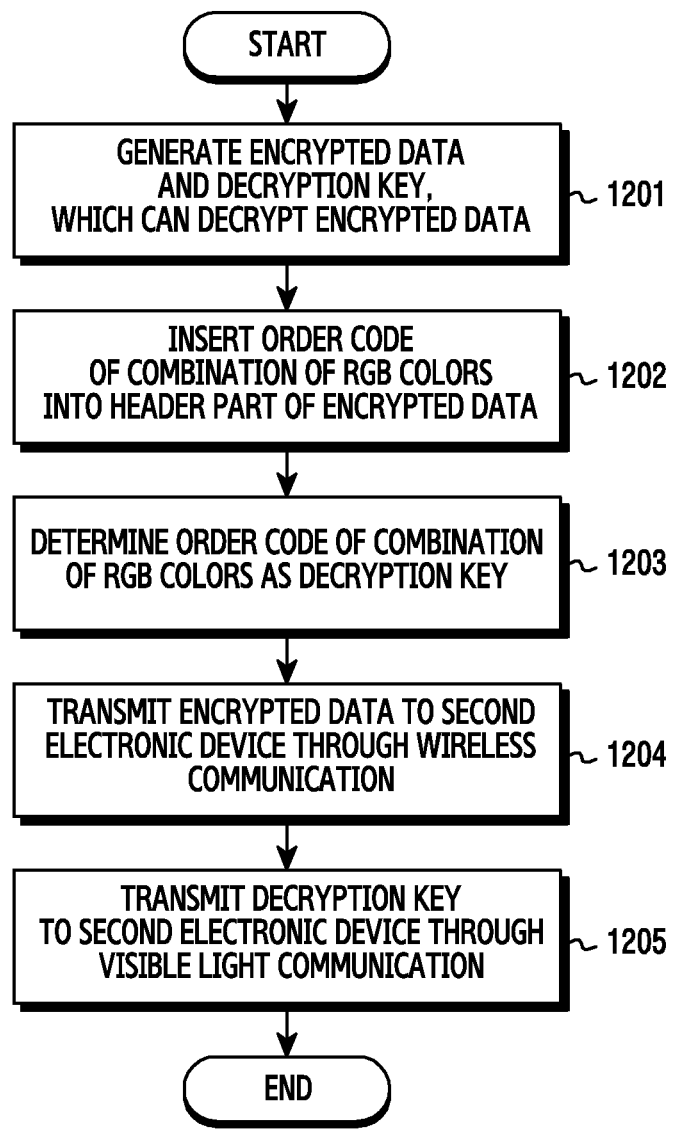
FIG. 12 is a flowchart of an example of a process according to various embodiments.

FIG. 12 is a flowchart of an example of a process according to various embodiments.

In operation 1201, the first electronic device may generate encrypted data and a decryption key, which can decrypt the encrypted data. According to an embodiment, the first electronic device may generate encrypted data A' generated by encrypting data A and a decryption key A", which can decrypt the encrypted data.

In operation 1202, the first electronic device may insert an order code of a combination of RGB colors into the encrypted data. For example, the first electronic device may insert the order code of the combination of the RGB colors into a header part of the encrypted data. According to an embodiment, the RGB order code included in the header part of the encrypted data may be a code indicating an RGB order transmitted to the second electronic device by the transmission module of the first electronic device. For example, the RGB order code transmitted to the second electronic device by the transmission module may be expressed as "1" when red, green, and blue lights are emitted and may be expressed as "0" when the lights are extinguished. Further, whether the transmission module emits the red, green, and blue lights may be expressed as "10111", "11100", and "11111", respectively. In the above-described example, the RGB order codes of the included in the header part of the encrypted data may be expressed as "10111", "11100", and "11111", respectively.

In operation 1203, the first electronic device may determine the order code of the combination of the RGB colors as the decryption key. According to an embodiment, the first electronic device may determine emission or extinguishing of visible light from the first electronic device as the decryption key like the order code of the combination of the RGB colors.

In operation 1204, the first electronic device may transmit the encrypted data to the second electronic device via wireless communication. According to an embodiment, the first electronic device may transmit the RGB order code included in the header part of the encrypted data to the second electronic device together with the encrypted data.

In operation 1205, the first electronic device may transmit the decryption key to the second electronic device via visible light communication. In the above-described example included in operation 1202, the transmission module may emit the RGB lights to the second electronic device in the same order as the RGB order codes included in the header part of the encrypted data. That is, the transmission module may emit red light, emit green light, and emit blue light in a preset first cycle, extinguish the red light, emit green light, and emit blue light in a preset second cycle, emit all the RGB lights in a preset third cycle, and emit the red light, extinguish the green light, and emit the blue light in preset fourth and fifth cycles.

Figure 13:
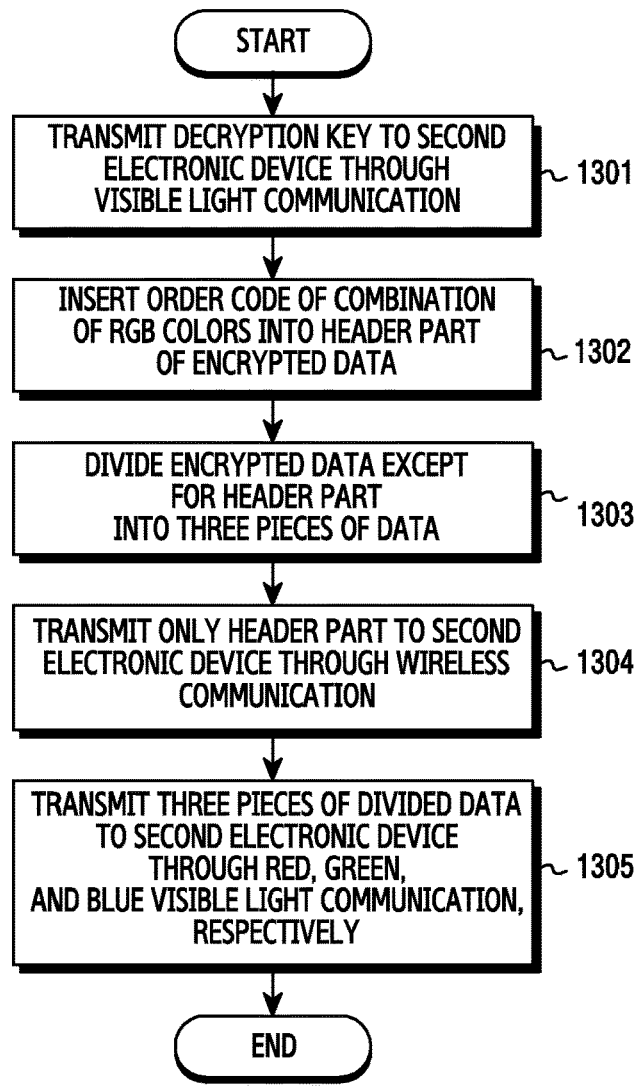
FIG. 13 is a flowchart of an example of a process according to various embodiments.

FIG. 13 is a flowchart of an example of a process according to various embodiments.

In operation 1301, the first electronic device may generate encrypted data and a decryption key, which can decrypt the encrypted data. According to an embodiment, the first electronic device may generate encrypted data A' generated by encrypting data A and a decryption key A", which can decrypt the encrypted data.

In operation 1302, the first electronic device may insert an order code of a combination of RGB colors into a header part of the encrypted data. According to an embodiment, the RGB order code included in the header part of the encrypted data may be a code indicating an RGB order transmitted to the second electronic device by the transmission module (for example, light emitting unit) of the first electronic device. For example, the RGB order code transmitted to the second electronic device by the transmission module may be expressed as "1" when red, green, and blue lights are emitted and may be expressed as "0" when the lights are extinguished. Further, whether the transmission module emits the light, green, and blue lights may be expressed as "10111", "11100", and "11111", respectively. In the above-described example, the RGB order codes included in the header part of the encrypted data may be expressed as "10111", "11100", and "11111", respectively.

In operation 1303, the first electronic device may divide the encrypted data except for the header part into three pieces of data. According to an embodiment, when the first electronic device transmits 12 GB of data to the second electronic device, the first electronic device may divide the data into 3 GB blocks.

In operation 1304, the first electronic device may transmit only the header part to the second electronic device via wireless communication. According to an embodiment, the first electronic device may transmit the RGB order code included in the header part of the encrypted data to the second electronic device together with the encrypted data.

In operation 1305, the first electronic device may transmit the three pieces of divided data to the second electronic device via red, green, and blue visible light communication, respectively. According to an embodiment, when the first electronic device transmits 12 GB of data to the second electronic device, the first electronic device may divide the data into 3 GB blocks and transmit the each of the blocks to the second electronic device via red, green, and blue visible light communication, respectively.

According to various embodiments, the first electronic device may transmit the divided data to the second electronic device based on an order code.

Figure 14:
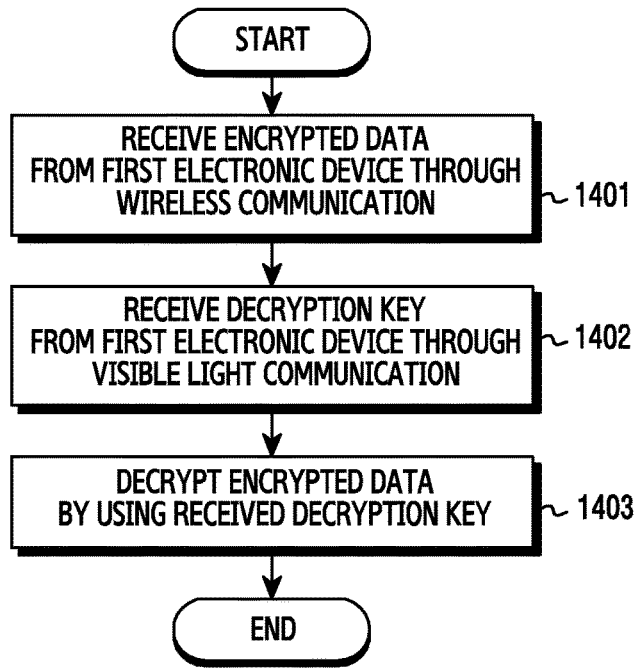
FIG. 14 is a flowchart of an example of a process according to various embodiments.

FIG. 14 is a flowchart of an example of a process according to various embodiments.

In operation 1401, the second electronic device may receive the encrypted data from the first electronic device via wireless communication. According to an embodiment, the second electronic device may receive encrypted data A' generated by encrypting data A from the first electronic device via wireless communication.

In operation 1402, the second electronic device may receive a decryption key from the first electronic device via visible light communication. According to an embodiment, the second electronic device may receive a decryption key A", which can decrypt the encrypted data A', from the first electronic device via visible light communication.

In operation 1403, the second electronic device may decrypt the encrypted data by using the received decryption key. According to an embodiment, the second electronic device may decrypt the encrypted data A' to be the data A by using the received decryption key A".

Figure 15:
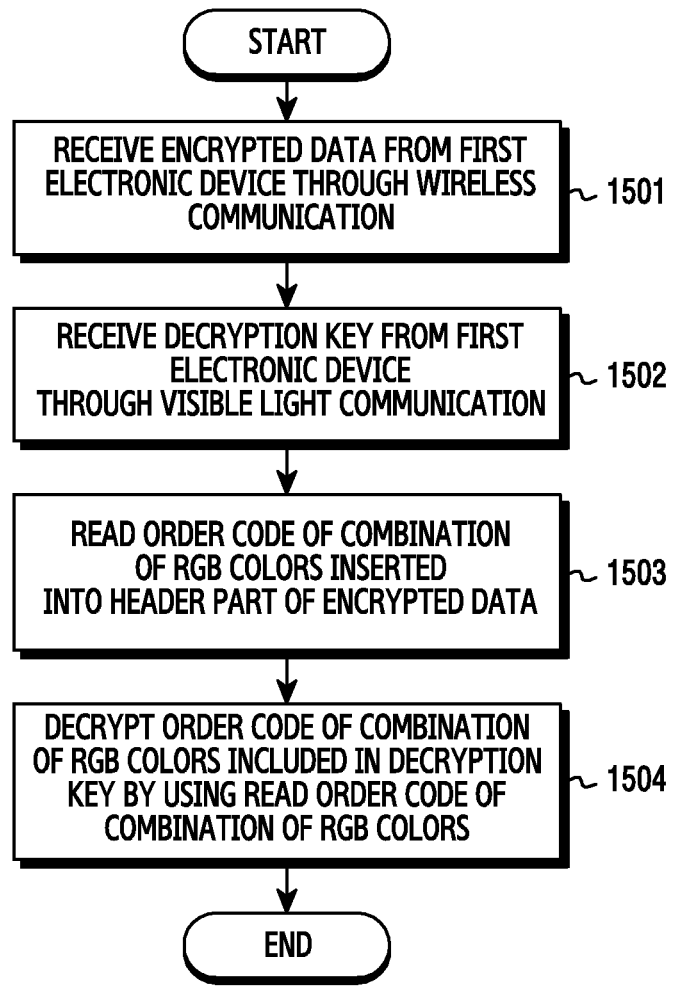
FIG. 15 is a flowchart of an example of a process according to various embodiments.

FIG. 15 is a flowchart of an example of a process according to various embodiments.

In operation 1501, the second electronic device may receive encrypted data from the first electronic device via wireless communication.

In operation 1502, the second electronic device may receive a decryption key from the first electronic device via visible light communication.

In operation 1503, the second electronic device may read an order code of a combination of RGB colors inserted into a header part of the encrypted data.

In operation 1504, the second electronic device may decrypt the order code of the combination of the RGB colors included in the decryption key by using the read order code of the combination of the RGB colors.

Figure 16:
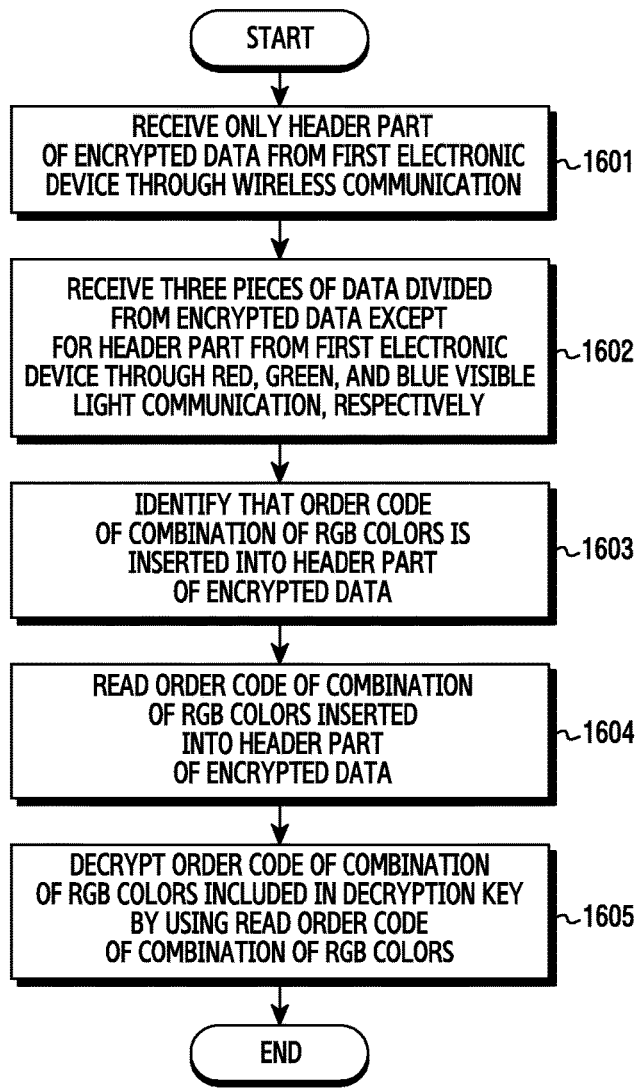
FIG. 16 is a flowchart of an example of a process according to various embodiments.

FIG. 16 is a flowchart of an example of a process according to various embodiments.

In operation 1601, the second electronic device may receive a header part of encrypted data from the first electronic device through wireless communication.

In operation 1602, the second electronic device may receive three pieces of data divided from the encrypted data except for the header part from the first electronic device in red, green, and blue color bands, respectively.

In operation 1603, the second electronic device may identify that an order code of a combination of RGB colors is inserted into the header part of the encrypted data.

In operation 1604, the second electronic device may read an order code of a combination of RGB colors inserted into a header part of the encrypted data.

In operation 1605, the second electronic device may decrypt the order code of the combination of the RGB colors included in the decryption key by using the read order code of the combination of the RGB colors.

Figure 17:
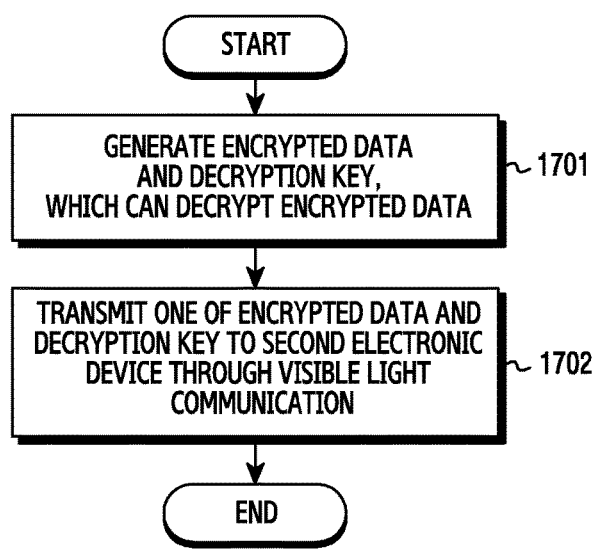
FIG. 17 is a flowchart of an example of a process according to various embodiments.

FIG. 17 is a flowchart of an example of a process according to various embodiments.

In operation 1701, the first electronic device may generate encrypted data and a decryption key, which can decrypt the encrypted data.

In operation 1702, the first electronic device may transmit at least one of the encrypted data and the decryption key to the second electronic device through visible light communication.

Figure 18:
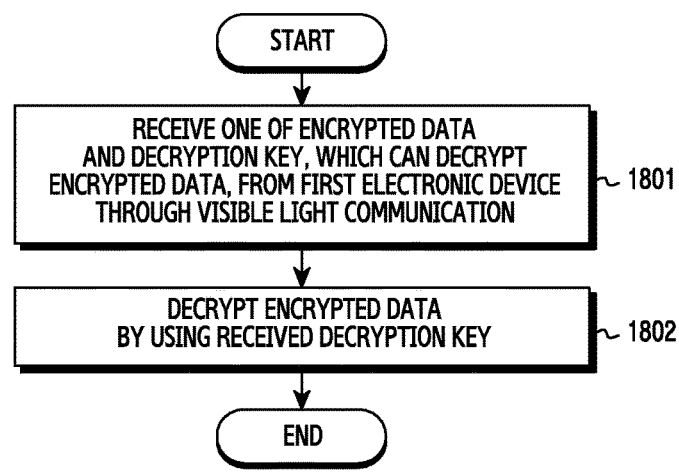
FIG. 18 is a flowchart of an example of a process according to various embodiments.

FIG. 18 is a flowchart of an example of a process according to various embodiments.

In operation 1801, the second electronic device may receive at least one of the encrypted data and the decryption key, which can decrypt the encrypted data, from the first electronic device through visible light communication.

In operation 1802, the second electronic device may decrypt the encrypted data by using the received decryption key.

Figure 19:
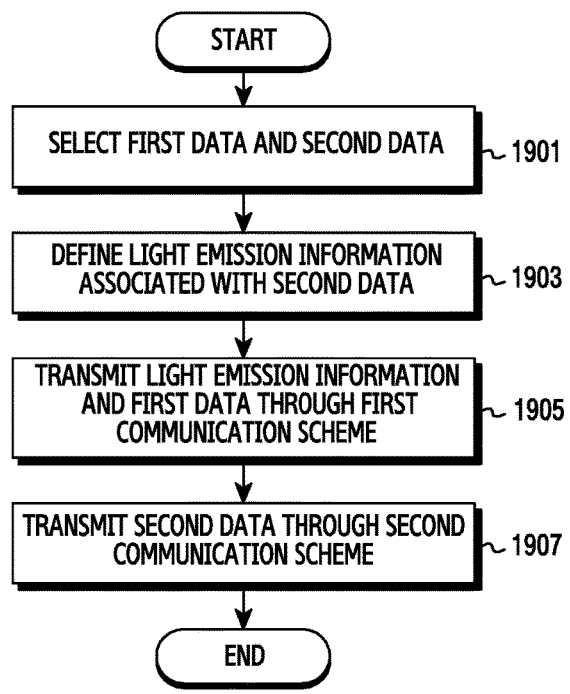
FIG. 19 is a flowchart of an example of a process according to various embodiments.

FIG. 19 is a flowchart of an example of a process according to various embodiments.

In operation 1901, the first electronic device may select first data and second data to be transmitted to the second electronic device. According to an embodiment, the first data may be encrypted data, and the second data may be a decryption key of the first data.

In operation 1903, the first electronic device may define light emission information related to the second data. According to various embodiments, the light emission information may include a quantity of emitted light and a color of emitted light of the transmitted second data.

In operation 1905, the first electronic device may transmit the light emission information and the first data via a first communication scheme. For example, the first electronic device may transmit the light emission information and the first data to the second electronic device by using short-range radio communication (e.g., Bluetooth, NFC, RFID, etc.) or cellular communication.

In operation 1907, the first electronic device may transmit the second data via a second communication scheme. For example, the first electronic device may transmit the second data to the second electronic device by using visible light communication. According to various embodiments, the first electronic device may transmit the second data in accordance with light emission information. For example, the light emission information may specify a color band to be used for the transmission of the second data.

Figure 20:
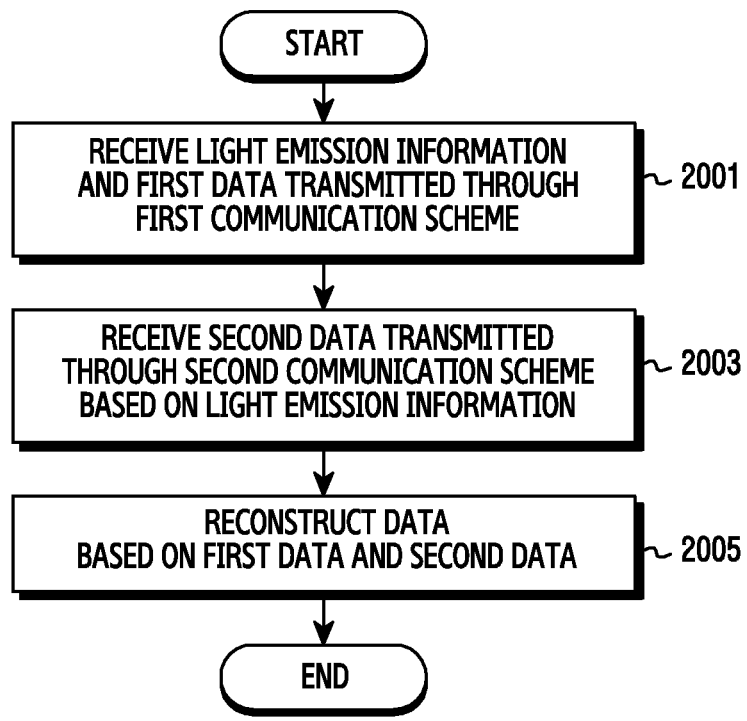
FIG. 20 is a flowchart of an example of a process according to various embodiments.

FIG. 20 is a flowchart of an example of a process according to various embodiments.

In operation 2001, the second electronic device may receive first data and light emission information transmitted via a first communication scheme from the first electronic device. According to an embodiment, the first data may be encrypted data, and the light emission information may identify an intensity of emitted light and a color of emitted light of the transmitted second data.

In operation 2003, the second electronic device may receive second data transmitted via a second communication scheme from the first electronic device based on light emission information. According to an embodiment, the second data may be a decryption key of the first data. According to an embodiment, when the second electronic device receives light emission information indicating a particular quantity of emitted light defined by the first electronic device, the second electronic device may receive the second data via a quantity of emitted light of the first electronic device corresponding to the light emission information. For example, the second electronic device may detect the light emission of the first electronic device corresponding to a plurality of levels and receive the second data via the light emission of a level corresponding to the light emission information.

According to another embodiment, when the second electronic device receives light emission information indicating a particular color defined by the first electronic device, the second electronic device may receive the second data via a color of emitted light of the first electronic device corresponding to the light emission information. For example, the second electronic device may detect the light emission of the first electronic device corresponding to a plurality of colors and receive the second data via the light emission of a color corresponding to the light emission information.

In operation 2005, the second electronic device may reconstruct the data transmitted by the first electronic device based on the received first data and second data.

According to various embodiments of the present disclosure, a method of operating a first electronic device may include: generating encrypted data and a decryption key, which can decrypt the encrypted data; and transmitting one of the encrypted data and the decryption key to a second electronic device via visible light communication.

The transmitting of the one of the encrypted data and the decryption key to the second electronic device via the visible light communication may include: transmitting the encrypted data to the second electronic device via wireless communication; and transmitting the decryption key to the second electronic device via the visible light communication.

The method may further include: inserting an order code of a combination of RGB colors into a header part of the encrypted data; and determining the order code of the combination of the RGB colors as the decryption key.

The transmitting of the one of the encrypted data and the decryption key to the second electronic device via the visible light communication may include: inserting the order code of the combination of the RGB colors into the header part of the encrypted data; and dividing the encrypted data except for the header part into three pieces of data.

The method may further include: transmitting only the header part to the second electronic device via the wireless communication; and transmitting three pieces of divided data to the second electronic device via red, green, and blue visible light communication, respectively.

According to various embodiments of the present disclosure, a method of operating a second electronic device may include: receiving one of encrypted data and a decryption key, which can decrypt the encrypted data, from a first electronic device via visible light communication; and decrypting the encrypted data by using the received decryption key.

The receiving of the one of the encrypted data and the decryption key, which can decrypt the encrypted data, from the first electronic device via the visible light communication may include: receiving the encrypted data from the first electronic device via wireless communication; and receiving the decryption key from the first electronic device via the visible light communication.

The method may further include: reading an order code of a combination of RGB colors inserted into a header part of the encrypted data; and decrypting the order code of the combination of the RGB colors included in the decryption key.

The receiving of the one of the encrypted data and the decryption key, which can decrypt the encrypted data, from the first electronic device via the visible light communication may include: receiving only the header part of the encrypted data from the first electronic device via the wireless communication; and receiving three pieces of data divided from the encrypted data except for the header part from the first electronic device via red, green, and blue visible light communication, respectively.

The method may further include identifying that the order code of the combination of the RGB colors is inserted into the header part of the encrypted data.

According to various embodiments, a method of operating a first electronic device may include: generating transmission data; transmitting at least a part of the transmission data to a second electronic device via wireless communication; and transmitting data, which is not transmitted via the wireless communication among the transmission data, to the second electronic device via visible light communication.

According to various embodiments, the method may further include: generating light emission information associated with the data transmitted via the visible light communication; and transmitting the light emission information to the second electronic device via the wireless communication.

According to various embodiments, the light emission information may be related to at least one of flickering, a quantity of emitted light, and a color of emitted light of a light emitting unit of the first electronic device.

According to various embodiments, the light emission information may be associated with a transmission order of a plurality of pieces of transmission data transmitted via the visible light communication.

According to various embodiments, the light emission information may be associated with a light emission state at a time point when the data is transmitted.

According to various embodiments, a method of operating a second electronic device may include: receiving at least a part of transmission data via wireless communication; receiving data, which is not transmitted via the wireless communication among the transmission data, via visible light communication; and reconstructing transmission data transmitted by a first electronic device based on the data received via the wireless communication and the visible light communication.

According to various embodiments, the method may further include: receiving, via the wireless communication, light emission information associated with the data transmitted via the visible light communication; and receiving data by controlling the visible light communication based on the light emission information.

According to various embodiments, the receiving of the data by controlling the visible light communication based on the light emission information may include: identifying a data transmission order based on the light emission information; and generating the data received via the visible light communication as one piece of data based on the data transmission order.

According to various embodiments, the receiving of the data by controlling the visible light communication based on the light emission information may include: identifying a light emission state of the first electronic device transmitting the data based on the light emission information; and receiving data by detecting light emission of the first electronic device based on the light emission state.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Various embodiments of the present disclosure can transmit one of encrypted data to be transmitted and a decryption key, which can decrypt the encrypted data, through visible light communication, so that a user can identify a data flow at a look, thereby improving security.

Various embodiments of the present disclosure disclosed in this specification and the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of various embodiments of the present disclosure fall within the scope of the present disclosure.

FIGS. 1-20 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
a memory storing instructions;
a visible light communication (VLC) transmitter;
a wireless communication transmitter; and
a processor, electrically coupled with the VLC transmitter, the wireless communication transmitter, and the memory, that is configured to execute the stored instructions to:
transmit, via the wireless communication transmitter to an external device, first data comprising encrypted data and information for identifying a decryption key included in second data to be transmitted via the VLC transmitter, the decryption key used for decrypting the encrypted data; and
transmit, via the VLC transmitter to the external device, the second data including the decryption key,
wherein the information for identifying the decryption key included in the second data comprises information on characteristic of visible light regarding the second data.

2. The electronic device of claim 1, wherein the information for identifying the decryption key included in the second data comprises another information on at least one of an intensity of the visible light regarding the second data, a flickering order of the visible light regarding the second data, a quantity of the visible light regarding the second data, or a color of the visible light regarding the second data.

3. The electronic device of claim 1, wherein the information is included in a header of the first data.

4. The electronic device of claim 1, wherein the second data is transmitted via the visible light.

5. The electronic device of claim 4,
wherein the second data is transmitted via at least one of first visible light, second visible light, or third visible light,
wherein a color of the first visible light corresponds to red,
wherein a color of the second visible light corresponds to green, and
wherein a color of the third visible light corresponds to blue.

6. An electronic device comprising:
a memory storing instructions;
a visible light communication (VLC) receiver;
a wireless communication receiver; and
a processor, electrically coupled with the VLC receiver, the wireless communication receiver, and the memory, is configured to execute the stored instructions to:
receive, from an external device via the wireless communication receiver, first data comprising encrypted data and information for identifying a decryption key included in second data to be received via the VLC receiver;
receive, from an external device via the VLC receiver, the second data for decryption of the encrypted data;
identify, based on the information, the decryption key from the second data; and
acquire user data by decrypting the encrypted data based on the identified decryption key,
wherein the information for identifying the decryption key included in the second data comprises information on characteristic of visible light regarding the second data.

7. The electronic device of claim 6, wherein the information for identifying the decryption key included in the second data comprises another information on at least one of an intensity of the visible light regarding the second data, a flickering order of the visible light regarding the second data, a quantity of the visible light regarding the second data, or a color of the visible light regarding the second data.

8. The electronic device of claim 6, wherein the information is included in a header of the first data.

9. The electronic device of claim 6, wherein the second data is transmitted via the visible light.

10. The electronic device of claim 9,
wherein the second data is transmitted via at least one of first visible light, second visible light, or third visible light,
wherein a color of the first visible light corresponds to red,
wherein a color of the second visible light corresponds to green, and
wherein a color of the third visible light corresponds to blue.

11. An electronic device comprising:
a memory storing instructions;
a visible light communication (VLC) transmitter; and
a processor, electrically coupled with the VLC transmitter, and the memory, that is configured to execute the stored instructions to:
generate encrypted data to be transmitted to an external device;
divide the encrypted data into first data, second data, and third data;
map the first data included in the encrypted data to first visible light, map the second data included in the encrypted data to second visible light, and map the third data included in the encrypted data to third visible light, wherein each wavelength range of the first visible light, second visible light, and third visible light is distinct; and
transmit, from the electronic device to the external device, the first data via the first visible light, the second data via the second visible light, and the third data via the third visible light.

12. The electronic device of claim 11,
wherein a wavelength range of the first visible light corresponds to wavelength range of red,
wherein a wavelength range of the second visible light corresponds to wavelength range of green, and wherein a wavelength range of the third visible light corresponds to wavelength range of blue.

13. The electronic device of claim 11, further comprising:
a wireless communication transmitter electrically coupled with the processor,
wherein the first data, the second data, and the third data are transmitted based on information on the transmitting, and
wherein the processor is further configured to execute the stored instructions to transmit, via the wireless communication transmitter to the external device, the information,
wherein the information associated with at least one of a transmission order of transmitted visible light, a flickering order of the transmitted visible light, an intensity of transmitted visible light, a quantity of the transmitted visible light or a color of the transmitted visible light, and
wherein the transmitted visible light comprises the first visible light, the second visible light, and the third visible light.

14. An electronic device comprising:
a memory storing instructions;
a wireless communication receiver; and
a processor, electrically coupled with the memory, configured to execute the stored instructions to:
receive, from an external device, first data via first visible light, second data via second visible light, and third data via third visible light,
wherein encrypted data is divided into the first data, the second data, and the third data,
wherein each wavelength range of the first visible light, the second visible light, and the third visible light is distinct,
wherein the first data is mapped to the first visible light,
wherein the second data is mapped to the second visible light, and
wherein the third data is mapped to the third visible light.

15. The electronic device of claim 14,
wherein a wavelength range of the first visible light corresponds to wavelength range of red,
wherein a wavelength range of the second visible light corresponds to wavelength range of green, and
wherein a wavelength range of the third visible light corresponds to wavelength range of blue.

16. The electronic device of claim 14, further comprising:
a wireless communication receiver electrically coupled with the processor,
wherein the processor is further configured to execute the stored instructions to receive, via the wireless communication receiver from the external device, information,
wherein the information associated with at least one of a transmission order of transmitted visible light, a flickering order of the transmitted visible light, an intensity of the transmitted visible light, a quantity of the transmitted visible light or a color of the transmitted visible light, and
wherein the transmitted visible light comprises the first visible light, the second visible light, and the third visible light.

* * * * *